Oct. 23, 1951 W. R. YOUNG, JR 2,572,235

MULTICHANNEL INTERMODULATION INTERFERENCE REDUCTION RADIO COMMUNICATION SYSTEM

Filed March 30, 1948 2 SHEETS—SHEET 1

INVENTOR
W. R. YOUNG
BY G. H. Stevenson
ATTORNEY

Oct. 23, 1951 W. R. YOUNG, JR 2,572,235

MULTICHANNEL INTERMODULATION INTERFERENCE REDUCTION RADIO COMMUNICATION SYSTEM

Filed March 30, 1948 2 SHEETS—SHEET 2

INVENTOR
W.R.YOUNG
BY G H Stevenson
ATTORNEY

Patented Oct. 23, 1951

2,572,235

UNITED STATES PATENT OFFICE 2,572,235

MULTICHANNEL INTERMODULATION INTERFERENCE REDUCTION RADIO COMMUNICATION SYSTEM

William R. Young, Jr., Summit, N. J., assignor to Bell Telephone Laboratories, Incorporated, New York, N. Y., a corporation of New York Application March 30, 1948, Serial No. 18,018

8 Claims. (Cl. 250—6)

This invention relates to radio communication systems and, more particularly, to means for reducing interference due to intermodulation in the mobile receivers of a multichannel frequency modulation radio communication system.

In urban multichannel mobile radio telephone systems, considerable interference has resulted from undesired carrier waves arriving at the input circuit of a mobile receiver with sufficient intensity to produce within the receiver itself interfering intermodulation products in the channel to which the mobile receiver is tuned. This is due to the fact that the first stages of a mobile radio receiver admit a much wider band of frequencies than the last stages because the selectivity is cumulative within the receiver; that is, each successive stage increases the over-all selectivity. Most of the over-all selectivity results from the stages that follow the first converter which with the amplification stages that precede it are open to interfering signals over a wide band of frequencies. It is within these first receiving stages that the normal selectivity of the receiver is liable to be destroyed by overloading produced when undesired carriers are received with considerable intensity, such as would be the case when a mobile receiver is in the vicinity of their points of origin.

When strong undesired carriers are received during the absence of a desired carrier, they are liable to produce within the first stages of the receiver strong intermodulation products having the same frequency as the desired carrier. These spurious signals seriously interfere with the operation of the communication system because, if the mobile subscriber lifts his handset to make a call, the sound of these spurious signals will lead him to believe that his channel is busy. Due to the erroneous impression caused by this false busy indication, the subscriber will replace his handset and will thus lose an opportunity to make a call.

Accordingly, it is an object of this invention to provide a multichannel mobile radio communication system with means for reducing overloading of the mobile radio receivers.

It is also an object of the invention to provide a multichannel mobile radio communication system with means for reducing interference due to intermodulation in the mobile radio receivers.

A further object of the invention is to prevent the capture of a communication channel in a multichannel radio communication system by an undesired carrier.

Another object of the invention is to provide means for automatically desensitizing the mobile radio receivers in a multichannel radio communication system whenever the intensity of the received carrier energy rises above a preassigned level.

An additional object of the invention is to provide means for automatically introducing attenuation into the first receiving stages of the mobile radio receivers in a multichannel radio communication system whenever the level of the received carrier energy becomes high and for providing full amplification whenever the level of the received carrier energy becomes low.

These and other objects of the invention are attained in a frequency modulation system by radiating all of the carriers, produced by the several transmitters, from the same transmitting point so that they will be received with approximately equal strength. This can be accomplished either by connecting all of the transmitters to a common antenna or by connecting each transmitter to a separate antenna and by either mounting the several antennas on the same mast or close together at a common transmitting point. The resulting equality in the level of the received carriers enables the selective and limiter circuits in the receivers to perform their characteristic function of excluding the undesired carriers. To prevent the capture of a channel by an undesired carrier, the transmitting stations are provided with means whereby the transmission of one carrier causes all of the other carriers to be radiated simultaneously regardless of whether all of them are modulated by signals. The reception of the desired carrier, even though it may be unmodulated, tends to saturate the limiter circuits in the receivers assigned to that channel and thereby prevents undesired carriers from seizing that channel. By thus saturating the limiter circuits, intermodulation products are excluded to an appreciable extent, especially when they are not particularly strong as would be the case when the mobile receivers are located some distance from the common transmitting point.

However, when the mobile receivers are in the immediate vicinity of the common transmitting point, the level of the received carriers will be so high that the limiter circuits will frequently be unable to suppress their strong intermodulation products and there is a hazard of overloading and consequent interference between channels. Such interference is substantially eliminated by employing means for automatically desensitizing each receiver in respect to all the carriers whenever the intensity of the energy in the input circuit of the receiver rises above a preassigned level. By thus attenuating the input energy in the first stages of a receiver, a decided improvement in reception is obtained due to the fact that for any given amount of attenuation the intermodulation products will be reduced to a much greater extent than the desired carrier. This automatic desensitization of the receivers reduces the level of the intermodulation products to such an extent that the limiter circuits will be able to suppress them effectively so that they will have no deleterious effect on the last receiving stages. Since the initial level of the desired carrier is quite high in this instance, due to the receiver being in the immediate vicinity of the transmitting point, it will not be attenuated to such a level as would degrade reception of the desired signals.

One method of accomplishing this automatic desensitization of a receiver is to utilize the grid-cathode circuit of the first limiter as an amplitude detector and to derive therefrom a variable voltage the magnitude of which is a function of the intensity of the received carrier energy. The voltage thus derived is applied as a variable negative bias to the control grid of the first radio frequency amplifier. A normal operating bias voltage is also applied to the control grid of this amplifier from a source of small fixed bias voltage having the same polarity as the variable bias voltage. In order to provide full amplification for signals of low level, means are provided for limiting the amount of variable bias applied to the amplifier to only that portion which is in excess of the fixed bias voltage thereby preventing the automatic desensitization of the receiver when weak carrier energy having an intensity below a preassigned level is received.

These and other features of the invention are more fully discussed in connection with the following detailed description of the drawing which illustrates a preferred embodiment of the invention incorporated in an urban multichannel mobile radio telephone system in which.

Figure 1:
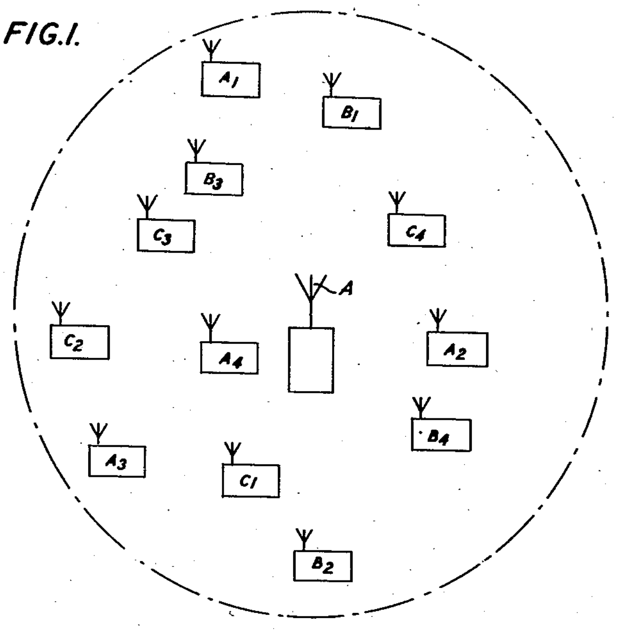
Fig. 1 is a schematic representation of the system as a whole.

In Fig. 1, an urban multichannel frequency modulation mobile radio telephone communication system is shown to include a plurality of mobile radio telephone receivers A1 to C4, inclusive, heterogeneously disposed at random about a common transmitting point represented by the common transmitting antenna A.

Figure 2:
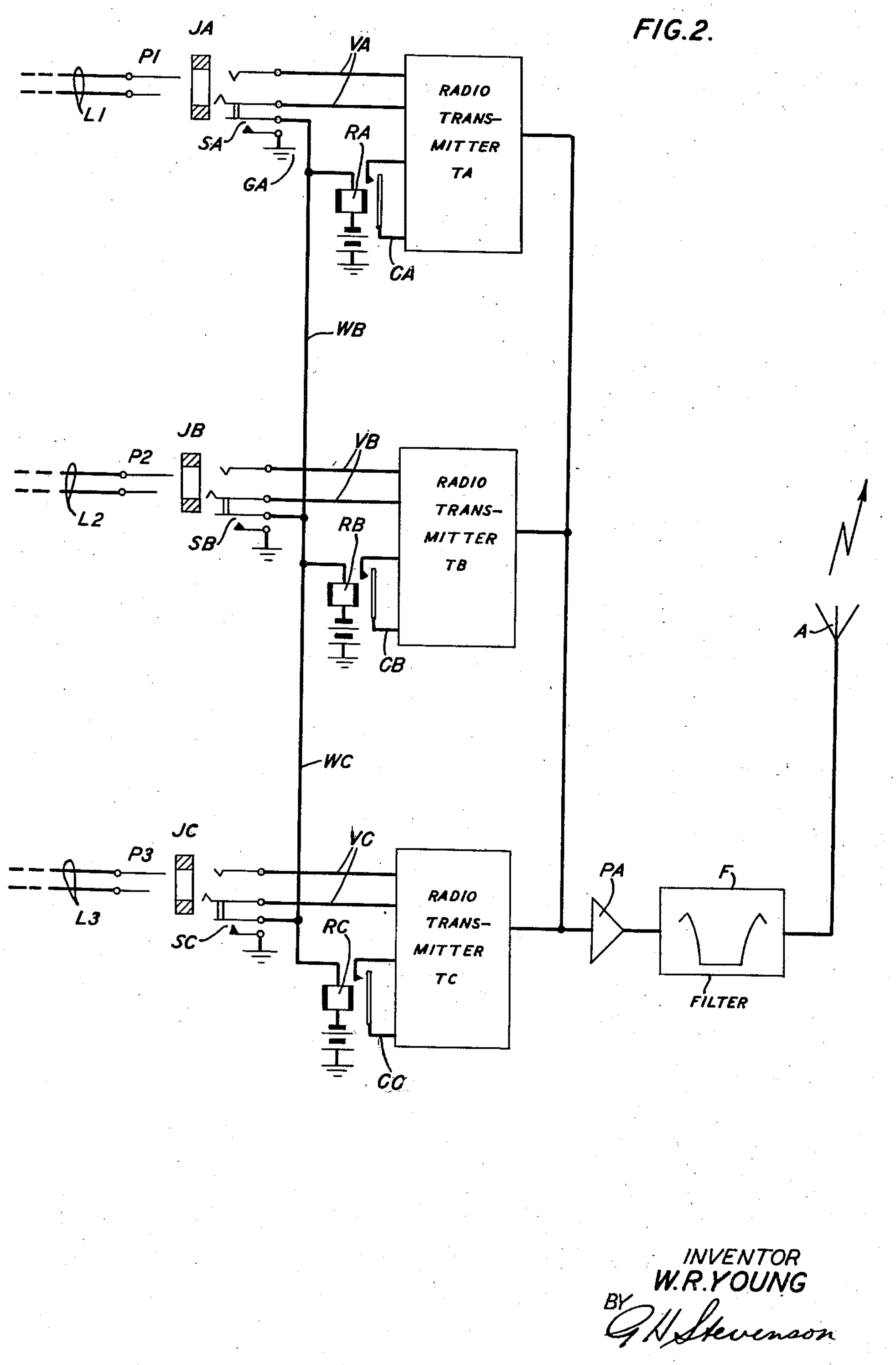
Fig. 2 illustrates significant details of the transmitting portion of the system.

It can be seen in Fig. 2 that the antenna A serves as a common radiating means for carrier waves produced by three frequency modulation radio telephone transmitters TA, TB, and TC which have their output circuits connected to a common antenna A through a common power amplifier PA and a common sharply selective band-pass filter F. It is to be understood that only three transmitters have been shown in order to simplify the description. Actually, many more transmitters may be connected in common to the antenna A. Separate antennas for each transmitter may be provided, in which case it is desirable that they be located fairly close together, for example on the roof of one building. Each transmitter is designed to generate carrier waves having a different preassigned frequency but having the same intensity as the other carriers. The individual carrier channels are closely separated from each other by a frequency separation of about 50 kilocycles and they all lie within the same band in the frequency spectrum and within the transmission band of the filter F.

Each of the carriers produced by the transmitters TA, TB, and TC can be modulated by speech currents carried by any of a number of telephone lines L1, L2, and L3 by connecting the associated operators' plugs P1, P2, and P3 with jacks JA, JB or JC which are associated respectively with the signal input circuits VA, VB, and VC connected to the transmitters TA, TB, and TC, respectively. Jacks JA, JB, and JC are each provided with a set of control contacts SA, SB, and SC, respectively, for controlling the starting and stopping of their associated transmitters TA, TB, and TC by controlling the energizing circuits of their associated power supply control relays RA, RB, and RC, respectively. Each of the contacts SA, SB, and SC is so constructed and arranged as to close when the operator's plug is inserted into the jack and to open when the plug is withdrawn. Whenever one of the contacts SA, SB, and SC is closed, it completes a circuit for energizing its associated control relay RA, RB, and RC, respectively, which will operate its armature to close the starting circuit CA, CB, or CC of its associated transmitter TA, TB, and TC, respectively, and when the contact is opened it opens the relay energizing circuit to release the relay's armature thereby opening the starting circuit CA, CB, or CC and stopping the transmitter.

Also, as was stated above, each of the transmitters TA, TB, and TC is provided with means whereby the transmission of one carrier causes all of the other carriers to be radiated simultaneously regardless of whether all of them are modulated by signals. This is effected by connecting together one side of each of the control relays RA, RB, and RC by means of the wires WB and WC. Thus, whenever transmission over the system is initiated from any one of the transmitters TA, TB, or TC, the common radiating means, constituted by the antenna A, will radiate the carriers of all of the transmitters TA, TB, and TC simultaneously.

For example, let it be assumed that the system is in an idle condition and that all of the energizing circuits for the transmitter control relays RA, RB, and RC are open, as is shown in the drawing. Assuming that transmission over the system is to be initiated by the transmitter TA, then its associated operator's plug P1 is inserted into its associated jack JA to connect the telephone line L1 to the transmitter signal input circuit VA. The insertion of the plug P1 into the jack JA also closes the contact SA thereby completing the circuit for energizing relay RA which operates its armature to close the starting circuit CA of its associated radio transmitter TA. The transmitter TA will now generate its assigned carrier and transmit it through the power amplifier PA and filter F to the antenna A for radiation therefrom. At the same time, the closure of contact SA applies ground GA to the wire conductors WB and WC to complete a circuit for energizing relays RB and RC. Relays RB and RC will therefore operate their armatures to close the starting circuits CB and CC of their respective transmitters TB and TC thus causing them to transmit their assigned carrier waves to the common antenna A for radiation therefrom. Communication may then be established by modulating the carrier of transmitter TA, the other carriers remaining unmodulated.

When it is desired to terminate transmission by the transmitter TA, the operator's plug P1 is withdrawn from the jack JA thereby permitting switch SA to open and to thereby remove the ground GA from the energizing circuits of relays RA, RB, and RC. All of the relays RA, RB, and RC will now become deenergized and will release their armatures thereby opening the starting circuits CA, CB, and CC of their respective transmitters TA, TB, and TC. This stops the generation and transmission of carrier waves by all of the transmitters TA, TB, and TC and restores the system to its idle condition as shown in the drawing.

A procedure similar to that just described is also followed whenever transmission is initiated by either the transmitter TB or TC. Thus, whenever transmission is initiated by any one of the transmitters TA, TB, or TC, all three carriers will be radiated simultaneously by the common antenna A. Although in the example explained above only one carrier was described as being modulated, it is to be understood that all or any number of the carriers may be modulated at the same time by speech currents carried by their associated voice lines.

These carriers are received by the mobile frequency modulation radio telephone receivers A1 to C4, inclusive, which may be considered as being divided into three groups. All of the receivers in the "A" group, namely, those receivers which in Fig. 1 are marked A1, A2, A3, and A4, have their selective circuits tuned to receive the carrier generated and transmitted by the transmitter TA. All of the receivers in the "B" group are tuned to receive the carrier from transmitter TB and all of the receivers in the "C" group are tuned to receive the carrier from transmitter TC. The mobile receivers in the different groups are not confined to separate geographical zones or areas; that is, the receivers in the "A" group are not restricted to movement solely within a preassigned area and the receivers in the "B" and "C" groups are not confined to "B" and "C" zones. Instead, the mobile receivers in all three groups are at liberty to intermingle within the entire area served by their associated transmitters TA, TB, and TC. Since all three carriers have equal strength and since they are all radiated from the same transmitting point, all three transmitters TA, TB, and TC will serve the same area. Therefore, at any one of the mobile receivers the three carriers will be received with approximately equal strength.

As was stated above, this equality in the level of the received carriers, which results from the fact that they are all transmitted from the same transmitting point, enables the limiter circuits in the receivers to perform their characteristic function of excluding the undesired carriers. For example, the limiter circuits in the "A" group of receivers will tend to discriminate against carrier waves from stations B and C.

This selective characteristic of the limiter circuits is enhanced by the fact that all of the carriers are radiated simultaneously. As was discussed above, the reception of the desired carrier, even though it is unmodulated, tends to saturate the limiter circuits in the receivers assigned to that channel and thereby prevents undesired carriers from seizing that channel. For example, let it be assumed that the carriers from transmitters TB and TC are being transmitted during the absence of the carrier from transmitter TA. Since the first stages of the mobile receivers admit a much wider band of frequencies than the last stages, due to the selectivity being cumulative within the receivers as was explained above, the carriers from transmitters TB and TC will enter the first stages of the receivers in the "A" group and will be liable to produce within those first stages strong intermodulation products having the same frequency as the carrier assigned to the transmitter TA. Such intermodulation products are liable to seriously interfere with the operation of the communication system as was described above.

However, such capture of a channel is prevented to a considerable extent by radiating all of the carriers simultaneously because this enables the limiter circuits of the receivers in each group to be saturated by their assigned carriers. By thus saturating the limiter circuits, intermodulation products are excluded to an appreciable extent, especially when they are not particularly strong as would be the case when the mobile receivers are located some distance from the common transmitting point.

When a mobile receiver is in the immediate vicinity of the common transmitting point, the level of the carrier energy entering the first stages of the receiver will be so high that the limiter circuits will frequently be unable to suppress the resulting strong intermodulation products and there is a hazard of overloading and consequent interference between channels. Such interference can be substantially reduced by employing means for automatically desensitizing each receiver in respect to all the carriers whenever the intensity of the carrier energy in the input circuit of the receiver rises above a preassigned level. By thus attenuating the input energy in the first stages of a receiver, a decided improvement in reception is obtained due to the fact that for any given amount of attenuation the intermodulation products will be reduced to a much greater extent than the desired carrier. This automatic desensitization of the receivers reduces the level of the intermodulation products to such an extent that the limiter circuits will be able to suppress them effectively so that they will have no deleterious effect on the last receiving stages. Since the initial level of the desired carrier is quite high in this instance, due to the receiver being in the immediate vicinity of the transmitting point it will not be attenuated to such a level as would degrade reception of the desired signals.

Figure 3:
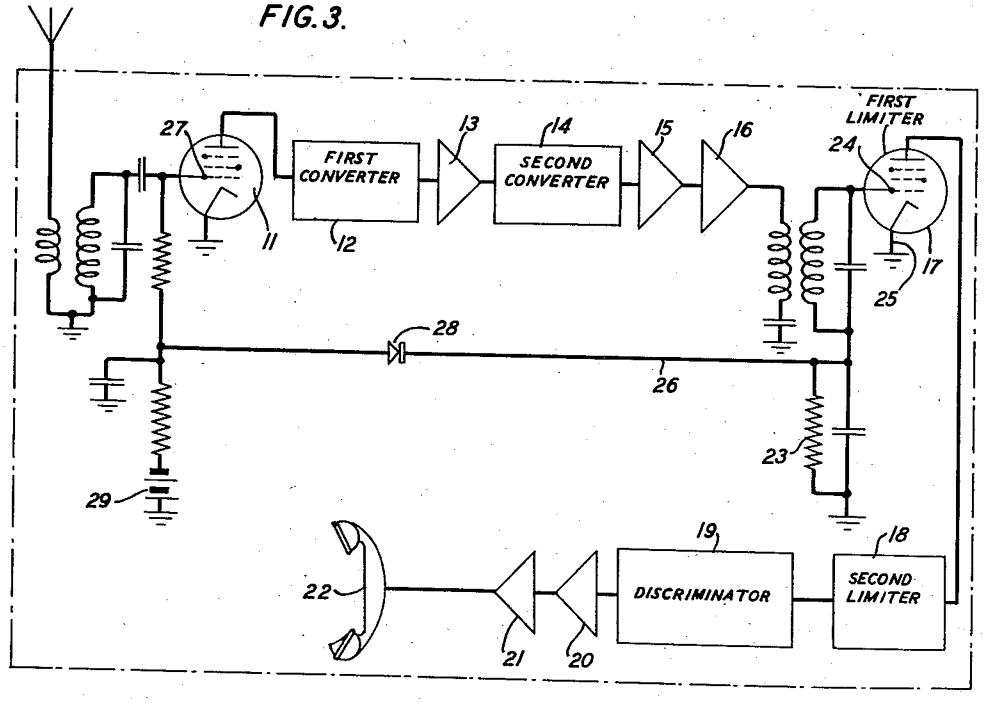
Fig. 3 shows the circuit of one of the mobile radio receivers.

The manner in which this automatic desensitization of the receivers is accomplished can be understood from the following detailed description of Fig. 3 which shows the circuit of one of the frequency modulation mobile receivers, it being understood that all receivers in the system are essentially similar. When electric wave energy is received by the frequency modulation radio telephone receiving circuit of Fig. 3, it is amplified by a radio frequency amplifier 11 and is then applied to a first converter 12 which reduces its frequency. It is further amplified by a high intermediate frequency amplifier 13 which supplies its output to a second converter 14 for an additional frequency reduction. The resulting intermediate frequency energy is amplified by a two-stage low intermediate frequency amplifier 15, 16 which has its output coupled to the input of a first limiter circuit 17. The output energy from the first limiter 17 is supplied to a second limiter circuit 18 which has its output coupled to a frequency modulation detector, or discriminator, 19. The detected energy is then amplified by a two-stage audio amplifier 20, 21 which has its output coupled to a signal reproducing device, such as a handset 22.

As was explained in the early part of this specification, interfering intermodulation products are liable to occur because of the fact that the first receiving stages admit a much wider band of frequencies than the last receiving stages due to the selectivity being cumulative within the receiver; that is, each successive stage increases the over-all selectivity. Most of the over-all selectivity results from the stages that follow the first converter 12 which with the radio frequency amplifier 11 that precedes it are open to interfering signals over a wide band of frequencies. It is within the radio frequency amplifier 11 and the first converter 12 that the normal selectivity of the receiver is most liable to be destroyed by overloading produced by the presence of undesired carriers, especially when these undesired carriers are received with considerable intensity as would be the case when the mobile receiver is in the vicinity of the common transmitting point.

Since all the carriers are transmitted simultaneously from the same transmitting point, they will all arrive at the input of the receiver with equal strength and since undesired carrier energy will never be received without the simultaneous reception of the desired carrier energy, even though it may be unmodulated, the limiter circuits 17 and 18 will tend to become saturated with their assigned carrier energy and will tend to perform their characteristic function of excluding, or suppressing, undesired energy. Intermodulation products will thus tend to be prevented from entering the discriminator 19, especially when they are not particularly strong as would be the case when the receiver is located some distance from the common transmitting point. However, if the mobile receiver is in the immediate vicinity of the common antenna A, the level of the received carriers will be so high that the limiter circuits 17 and 18 will be unable to suppress their strong intermodulation products and there is a hazard of overloading and consequent interference between channels.

Such interference is substantially eliminated by automatically desensitizing the receiver in respect to all the carriers whenever the intensity of the energy in its input circuit rises above a preassigned level. In other words, additional loss or attenuation is automatically introduced into the input circuit of the receiver ahead of the intermodulation point whenever the strength of the received energy requires it and is automatically removed when the level of the received energy becomes low. This is accomplished by deriving a varying control voltage from an amplitude detector stage located at a relatively high level point in the receiving circuit and using it to control, or vary, attenuation in one of the first stages in the receiving circuit. The method of control may be either mechanical or electronic, such as the electronic method used in the receiving circuit shown in Fig. 3.

In the receiving circuit of Fig. 3, a large resistor 23, such as 19,000 ohms, is connected in the grid-cathode circuit 24, 25 of the first limiter 17 which is utilized as an amplitude detector. When the circuit is in operation a varying negative control voltage is developed across the resistor 23. Since the grid-cathode circuit of the limiter 17 functions as an amplitude detector, the magnitude of this control voltage is related to the strength of the energy applied to the control grid of the limiter 17 and is therefore a function of, or proportional to, the strength of received carrier energy. The voltage thus developed across the resistor 23 is connected by a conductor 26 to the biasing circuit of the radio frequency amplifier 11 and is applied to the control grid 27 thereof as a varying negative bias voltage. When the level of the received carrier energy increases, the control voltage developed across the resistor 23 increases correspondingly with the result that the bias on the control grid 27 of the radio frequency amplifier 11 becomes progressively more negative.

This increase in the negative bias applied to the control grid 27 of the radio frequency amplifier 11 desensitizes the receiver in respect to all the carriers by effecting a reduction in the level of the energy applied by the radio frequency amplifier 11 to the first converter 12 and the succeeding stages of the receiving circuit. Since this attenuation is introduced into the receiving circuit ahead of the intermodulation point, which, as was stated above, is the first converter 12, and since each of the undesired carriers is attenuated, then it follows that their cross products will be attenuated to a much greater extent. Therefore, the intensity of any intermodulation products will be reduced to such a low level that the limiter circuits 17 and 18 can readily suppress them. Since the initial level of the desired carrier is quite high in this instance, due to the mobile receiver being in the immediate vicinity of the common transmitting point, it will not be attenuated to such a level as would degrade reception of the desired signals. Thus, the receiver is automatically desensitized whenever the level of the received energy is high.

However, this automatic desensitization of the receiver is not desired when the level of the received energy is low as would be the case when the mobile receiver is located a considerable distance from the common transmitting point, such as at or near the edge of the service area. Under these circumstances, full amplification should be provided for weak signals so that they will be properly reproduced in the handset 22. Furthermore, since all the carriers are received with equal strength, then it follows that, when the level of the desired carrier is low, the level of the undesired carriers will also be low and, under the circumstances just described, their intermodulation products will be so low that the limiter circuits 17 and 18 will be able to suppress them without the assistance of the automatic desensitization means. Therefore, it is desirable to prevent the receiver from being automatically desensitized when weak signals are being received and to insure that automatic desensitization will take place only when the intensity of the received carrier energy rises above the level required for proper reproduction of the signals.

This is accomplished by inserting a diode rectifier 28 into the circuit of the conductor 26 and by connecting a battery 29 into the biasing circuit of the radio frequency amplifier 11 for providing a small fixed negative bias voltage, such as —2.5 volts, as a normal operating bias voltage for the amplifier 11. When no voltage is developed across the resistor 23, the negative bias voltage applied by the battery 29 to the control grid 27 of the radio frequency amplifier 11 will be sufficient for the proper operation of the amplifier 11. If during the reception of weak signals, a small voltage should be developed across the resistor 23, it would tend to be applied by the conductor 26 to the biasing circuit of the amplifier 11 where it would be added to the —2.5 volts from the battery 29 with the result that the receiver would be desensitized at a time when full amplification was required.

Such undesired desensitization is prevented by the diode rectifier 28 which is so disposed in the circuit of the conductor 26 as to constitute a high impedance when the auxiliary biasing voltage developed across the resistor 23 is less than —2.5 volts. This performs two functions. Firstly, by presenting this high impedance, the rectifier 28 prevents the battery 29 from discharging during those occasions when there is no voltage across the resistor 23. Secondly, it blocks the flow of control voltage whenever this voltage is less than —2.5 volts, thereby providing full amplification when the received energy is of low level.

When the intensity of the received energy rises to a sufficiently high level to develop a control voltage across the resistor 23 of more than —2.5 volts, then the excess over —2.5 volts will be added to the —2.5 volts from the battery 29 thereby effecting attenuation of the received carrier energy. As the intensity of the received carrier energy becomes stronger, the magnitude of the control voltage will increase correspondingly and the resulting attenuation will become greater as was described above.

Although an electronic method of varying the applied attenuation has been shown and described, it is to be understood that the invention is not to be limited to this method. If desired, a mechanical method may be employed such as a motor driven attenuator having its operation controlled by an armature and contact of a relay the energization of which is, in turn, controlled by current derived from the amplitude detector.

The grid-cathode circuit of the first limiter 17 has been utilized as an amplitude detector because it has the advantage of being located at a relatively high level point in the receiving circuit. It will be understood however that this detector may be located at other points in the circuit if desired, the principal concern being that the detected current should reflect in its amplitude variations the variations of the carrier wave at the receiver input.

It is to be understood that the invention is not limited to use in a one-way multichannel communication system but can also be used in a system in which the mobile radio sets are equipped not only for the reception of signals but also for the transmission of signals. These mobile radio sets may be mounted in ships, aircraft, or other vehicles.

It is to be further understood that the invention is not limited to the use of a diode rectifier for blocking the control voltage when it is weak as this can also be accomplished by biasing the amplitude detector so that no control voltage is developed by rectification of the carrier energy until its intensity rises above a preassigned level.

What is claimed is:

1. In a multichannel radio system for communication with mobile stations comprising a plurality of stationary radio transmitters each including a source of carrier waves of an assigned frequency in a group of closely spaced radio channels and an input circuit for modulating signals; radiating means for all of said transmitters located at a common point for radiating all of said carrier waves with equal strength whereby any one of said mobile stations is always within equal transmitting range of each of said transmitters, a plurality of signal sources, connecting means for selectively connecting said signal sources to said input circuits, a common starting circuit for said carrier wave sources, and switching means operated by the connection of any one of said signal sources to the signal circuit of one transmitter for energizing said common circuit to start the operation of all of said carrier sources whereby all of the carrier waves are radiated simultaneously.

2. A multichannel radio communication system comprising in combination with a multichannel transmitting station as set forth in claim 1 and a plurality of groups of mobile receivers, all of the receivers in each group being tuned to respond to radiated carrier waves of one of said assigned frequencies which is different from the assigned frequencies of the carrier waves to which the receivers in the other groups are tuned, each receiver including a radio frequency amplifier and a heterodyne converter which tends to produce undesired modulation products when subject to overloading by received carrier waves, and each receiver including automatic gain control means responsive to amplitude variations of the received carrier waves and operative to control the gain of its radio frequency amplifier inversely with respect to variations of the amplitude of the received carrier waves.

3. In a multichannel radio system for communication with mobile stations comprising a plurality of stationary radio transmitters each including a source of carrier waves of an assigned frequency in a group of closely spaced carrier channels and a signal circuit arranged to modulate the carrier waves in accordance with impressed signals; radiating means for all of said transmitters located at a common point, a plurality of signal sources, connecting means for selectively connecting any one of said signal sources to any selected one of said transmitters for modulating only the carrier of the connected transmitter means operating upon actuation of said connecting means for starting the connected radio transmitter and causing its carrier waves modulated by only the signals from the connected source to be applied to said radiating means for radiation therefrom, and means also operating upon actuation of said connecting means to start all of the other of said radio transmitters for causing their carrier waves to be applied unmodulated by the signals from said connected source to said radiating means for radiation therefrom.

4. A multichannel radio communication system comprising in combination a transmitting station as set forth in claim 3 wherein said radio transmitters include means for modulating the frequency of said carrier waves with signals from the connected sources, and a plurality of groups of mobile receivers, all of the receivers in each group being tuned to respond to radiated carrier waves of one of said assigned frequencies which is different from the assigned frequencies of the carrier waves to which the receivers in the other groups are tuned, said receivers each including in succession a radio frequency amplifier, a heterodyne converter, an amplitude limiter, automatic volume control means responsive to amplitude variations of the received wave and operative to control inversely the gain of the radio frequency amplifier whereby the amplitude of the carrier waves supplied to the converter is maintained substantially constant, and a rectifier for preventing operation of said automatic volume control means when the level of the received carrier waves falls below an assigned value.

5. A multichannel radio system for providing communication service within a single geographic service area, said system comprising in combination a plurality of fixedly located frequency modulation radio transmitters each designed to generate electric carrier energy of substantially the same intensity as that produced by the others but having a respectively different mean frequency, the mean frequencies of all of said carriers being closely spaced from each other within an assigned portion of the frequency spectrum, a plurality of groups of mobile frequency modulation radio receivers within said single geographic service area for receiving said carriers, all of the receivers in each group being particularly tuned to receive an assigned one of said carriers which is different from the carriers to which the receiver in the other groups are tuned, each of said transmitters having a signal input circuit and a normally disabled starting circuit, a plurality of independent sources of signaling energy, coupling means for coupling any one of said signal sources to any one of said transmitter signal input circuits for modulating the frequency of only the carrier energy generated by the coupled transmitter, control means actuated by the coupling of any one of said signal sources to any one of said signal input circuits for enabling all of said starting circuits to start all of said transmitters substantially simultaneously, radiating means located at a single transmitting point within said single geographic service area for radiating all of said different carrier energies, and a common circuit extending from each of said transmitters to said radiating means for supplying all of said carriers generated by all of said transmitters to said single transmitting point for simultaneous radiation therefrom by said radiating means whereby any one of said mobile receivers is always within equal transmitting range of all of said transmitters.

6. A multichannel radio communication system in accordance with claim 5 wherein said control means includes a plurality of electroresponsive devices, one device for each starting circuit, a single energizing circuit for energizing all of said devices substantially simultaneously, and a plurality of instrumentalities for controlling said single energizing circuit, one instrumentality for each signal input circuit, each of said instrumentalities being actuated by the coupling to its respective signal input circuit of any one of said signal sources.

7. A multichannel radio system for providing communication service within a single geographic service area, said system comprising in combination a plurality of fixedly located frequency modulation radio transmitters each designed to generate electric carrier energy of substantially the same intensity as that produced by the others but having a respectively different mean frequency, the mean frequencies of all of said carriers being closely spaced from each other within an assigned portion of the frequency spectrum, each of said transmitters having a signal input circuit and a normally disabled starting circuit, a plurality of independent sources of signaling energy, coupling means for coupling any one of said signal sources to any one of said transmitter signal input circuits for modulating the frequency of only the carrier energy generated by the coupled transmitter, radiating means located at a single transmitting point within said single geographic service area for radiating all of said different carrier energies generated by all of said transmitters, a plurality of groups of mobile frequency modulation radio receivers within said single geographic service area for receiving said radiated carriers, all of the receivers in each group being particularly tuned to receive an assigned one of said carriers which is different from the carriers to which the receivers in the other groups are tuned, each of said receivers having a limiter circuit and signal reproducing means for reproducing the signals modulating the frequency of its assigned carrier, said signal reproducing means being subject to impairment by intermodulation products of said closely spaced carriers, each of said limiter circuits having a characteristic function of normally excluding from said signal reproducing means said intermodulation products when the respective assigned carrier energy is being received, and automatic control means for enabling the limiter circuits in all of said receivers to perform their characteristic exclusion function whenever the frequency of any one of said carriers is modulated with signaling energy from any one of said signal sources, said automatic control means being actuated by the coupling of any one of said signal sources to any one of said signal input circuits to enable all of said starting circuits to start all of said transmitters substantially simultaneously, and a common circuit extending from each of said transmitters to said radiating means for supplying all of said carriers generated by all of said transmitters to said single transmitting point for simultaneous radiation therefrom by said radiating means to all of said receivers.

8. A multichannel radio communication system in accordance with claim 7 wherein each of said receivers includes automatic volume control means for preventing its respective limiter circuit from being overloaded by strong carrier energy received when its respective mobile radio receiver is in the immediate vicinity of the single transmitting point, and each of said receivers also having blocking means for rendering ineffectual its respective automatic volume control means when the respective mobile radio receiver is near the boundary of said single geographic service area.

WILLIAM R. YOUNG, Jr.

REFERENCES CITED

The following references are of record in the file of this patent:

UNITED STATES PATENTS

| Number | Name | Date |
|---|---|---|
| 1,559,867 | Griggs | Nov. 3, 1925 |
| 1,568,939 | Clement | Jan. 5, 1926 |
| 1,572,756 | Smythe et al. | Feb. 9, 1926 |
| 1,616,638 | Ryan | Feb. 8, 1927 |
| 1,628,411 | Kranz | May 10, 1927 |
| 1,637,403 | Abbott | Aug. 2, 1927 |
| 1,755,980 | Clement | Apr. 22, 1930 |
| 1,766,050 | Young | June 24, 1930 |

(References on following page)

UNITED STATES PATENTS

| Number | Name | Date |
|---|---|---|
| 1,934,423 | Green | Nov 7, 1933 |
| 2,064,904 | Green | Dec. 22, 1936 |
| 2,117,664 | Holst | May 17, 1938 |
| 2,144,304 | Braden | Jan. 17, 1939 |
| 2,273,097 | Foster et al. | Feb. 17, 1942 |
| 2,273,098 | Foster | Feb. 17, 1942 |
| 2,281,693 | Holst et al. | May 5, 1942 |
| 2,282,092 | Roberts | May 5, 1942 |
| 2,292,222 | Haigis | Aug. 4, 1942 |
| 2,329,004 | Shope et al. | Sept. 7, 1943 |
| 2,393,291 | Clark | Jan. 22, 1946 |
| 2,395,737 | Hansell | Feb. 26, 1946 |
| 2,399,968 | Whitelock | May 7, 1946 |
| 2,404,712 | Hollingsworth | July 23, 1946 |
| 2,421,017 | Deloraine | May 27, 1947 |
| 2,429,504 | Tiegler | Oct. 21, 1947 |
| 2,429,607 | Capen | Oct. 28, 1947 |
| 2,462,224 | Rheams | Feb. 12, 1949 |
| 2,490,061 | Jensen et al. | Dec. 6, 1949 |